United States Patent
Loga et al.

(10) Patent No.: US 8,215,340 B2
(45) Date of Patent: Jul. 10, 2012

(54) ORIFICE PLATE CARRIER

(75) Inventors: Thomas Henry Loga, Sugar Land, TX (US); Ronald Doom, Spring, TX (US); Darren Scott Schwarz, Cypress, TX (US); Gerald Wayne Blankenship, Houston, TX (US); Robin C. Palmer, Huston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 1178 days.

(21) Appl. No.: 12/033,452

(22) Filed: Feb. 19, 2008

(65) Prior Publication Data
US 2009/0205732 A1 Aug. 20, 2009

(51) Int. Cl.
*F16L 55/027* (2006.01)
*F16L 55/10* (2006.01)
*F16L 17/06* (2006.01)
*G01F 1/42* (2006.01)
*H02G 15/04* (2006.01)

(52) U.S. Cl. ............. 138/44; 138/40; 138/94; 138/94.3; 277/608; 277/609

(58) Field of Classification Search ............. 138/37, 138/40, 41, 44, 94, 94.3, 104; 277/608, 609, 277/612
See application file for complete search history.

(56) References Cited

U.S. PATENT DOCUMENTS

| 2,050,544 | A | * | 8/1936 | Robinson et al. | 138/44 |
| 4,503,594 | A | * | 3/1985 | Gall et al. | 29/890.142 |
| 5,069,252 | A | * | 12/1991 | Kendrick et al. | 138/44 |
| 5,186,474 | A | * | 2/1993 | Jacobs | 277/637 |
| 5,617,899 | A | * | 4/1997 | Linton et al. | 138/44 |
| 5,655,571 | A | | 8/1997 | Gawlik | |
| 5,836,356 | A | * | 11/1998 | Desai | 138/44 |

FOREIGN PATENT DOCUMENTS
JP 59054864 3/1984

OTHER PUBLICATIONS

International Application No. PCT/US2009/033767 Search Report and Written Opinion dated Aug. 31, 2009.

* cited by examiner

*Primary Examiner* — Len Tran
*Assistant Examiner* — Ryan Reis
(74) *Attorney, Agent, or Firm* — Conley Rose, P.C.

(57) ABSTRACT

An orifice plate carrier for positioning an orifice plate within an orifice fitting to measure fluid flow rate through a conduit is disclosed. In some embodiments, the plate carrier has an opening therethrough and an inner surface surrounding the opening. A lip extends radially from the inner surface to support an orifice plate assembly with an orifice plate disposed therein. At least one flow port extends through the body. Each flow port is configured to allow fluid therethrough and to reduce a pressure differential between fluid up and downstream of the orifice plate during installation and extraction. At least two notches, each notch extending radially from the inner surface, engage the orifice plate and maintain the concentric position of the orifice plate within the fitting.

21 Claims, 5 Drawing Sheets

ORIFICE PLATE CARRIER

BACKGROUND

This disclosure relates generally to orifice fittings for measuring fluid flow rates through pipes or other conduits. More particularly, the disclosure relates to an orifice plate carrier for use in orifice fittings.

Fluid flow rate is the quantification of bulk fluid or gas movement, typically measured as volumetric and mass flow rates. The ability to measure reliably and accurately fluid flow rates serves an important function in a variety of processes and industries (e.g, chemical processing, oil and gas transport and production, etc.). An orifice fitting is one of many devices that may be used to measure volumetric or mass flow rate of fluids flowing through a pipe or conduit. An orifice fitting typically employs a flat, thin plate having a central orifice that is smaller in diameter than the diameter of the conduit in which the plate is disposed. The orifice plate is positioned between a sealing ring and a compression ring that may be held together by a fastener to form an orifice plate assembly. The orifice plate assembly is disposed within a plate carrier, which is, in turn, supported and aligned within the orifice fitting. The mass fluid flow rate through the conduit is calculated from the pressure differential measured across the orifice plate, as well as other parameters.

When using an orifice fitting to measure fluid flow, many factors must be considered in order to obtain accurate flow estimates. Conventionally, the orifice plate assembly is positioned within the orifice fitting with the seal and compression rings positioned on the upstream and downstream sides, respectively, of the orifice plate. A seal is provided between the seal ring and orifice plate, but no seal is provided between the orifice plate and the compression ring. With these unidirectional orifice plate assemblies, leakage may occur if the compression ring side of the orifice plate assembly is inadvertently positioned upstream. Leakage results in reduced pressure drop across the orifice plate and inaccurate estimations of fluid flow through the fitting. Thus, the orientation of the orifice plate assembly relative to the orifice plate carrier is an important consideration.

An effective seal between the orifice plate assembly and the orifice plate carrier is another important consideration. In the event that the seal between the orifice plate assembly and the orifice plate carrier distorts, even over a small region, the orifice plate assembly may rotate relative to the plate carrier and leakage may occur.

Alignment of the orifice plate carrier relative to the orifice fitting is yet another important consideration. When the plate carrier is mismounted or improperly seated within the fitting, the orifice plate may not be normal to fluid flow through the fitting or concentric within the flowbore of the fitting. Misalignment of the orifice plate causes erroneous pressure drop readings across the orifice plate and therefore, inaccurate estimates of fluid flow through the fitting.

Lastly, during insertion and extraction of the orifice plate carrier from the orifice fitting, the plate carrier may momentarily interrupt fluid flow through the orifice plate. Interruption of flow through the orifice plate causes a spike in fluid pressure upstream of the orifice plate. A sensor positioned upstream of the orifice plate then may be exposed to a fluid pressure beyond its operational limit, resulting in erroneous upstream pressure measurement.

Thus, features for an orifice plate carrier that reduce leakage around an orifice plate disposed within the plate carrier and promote concentric alignment of the orifice plate are desirable.

SUMMARY

An orifice plate carrier is disclosed for positioning an orifice plate within an orifice fitting to measure fluid flow through a conduit. In some embodiments, the orifice plate carrier includes a body having an opening therethrough and an inner surface surrounding the opening. The inner surface has an edge with a length. A lip extends radially from the inner surface into the opening and along the full length of the edge of the inner surface. The lip has a thickness less than a thickness of the inner surface. An annular recess is created by the inner surface and the lip. The annular recess is configured to receive an orifice plate assembly inserted through the opening to engage the lip.

In other embodiments, the orifice plate carrier includes a body having an opening therethrough and an inner surface surrounding the opening. At least two notches extend radially from the inner surface into the opening. Each notch is configured to engage an edge of an orifice plate inserted into the opening. A first notch is located below a horizontal line bisecting the opening and to one side of a vertical line bisecting the opening. A second notch is located below the horizontal line and to the other side of the vertical line. The first notch and the second notch are equidistant from a centerpoint of the opening.

In still other embodiments, the orifice plate carrier includes a body having at least one flow port therethrough. Each flow port is configured to allow fluid therethrough and to reduce a pressure differential between fluid on one side of the body and fluid on another side of the body during installation and extraction.

An embodiment of an orifice fitting includes a conduit having a through passage and an orifice plate carrier in accordance with the principles disclosed herein removably disposed within the conduit. The orifice plate carrier includes a body having an opening therethrough and an inner surface surrounding the opening. The inner surface has an edge with a length. A lip extends radially from the inner surface into the opening and along the full length of the edge of the inner surface. The lip has a thickness less than a thickness of the inner surface. An annular recess is created by the inner surface and the lip. An orifice plate assembly is positioned within the annular recess to engage the lip. A flow port extends through the body. The flow port is configured to allow fluid therethrough and to reduce a pressure differential between fluid on one side of the body and fluid on another side of the body during installation and extraction. At least two notches extend radially from the inner surface to engage an orifice plate disposed within the orifice plate assembly. A first notch is located below a horizontal line bisecting the opening and to one side of a vertical line bisecting the opening. A second notch is located below the horizontal line and to the other side of the vertical line. The first notch and the second notch are equidistant from a centerpoint of the opening.

The foregoing has outlined rather broadly features of disclosed embodiments in order that the detailed description that follows may be better understood. Additional features will be described hereinafter that form the subject of certain of the claims.

BRIEF DESCRIPTION OF THE DRAWINGS

For a detailed description of the various embodiments, reference will now be made to the accompanying drawings in which.

DETAILED DESCRIPTION

Figure 1:
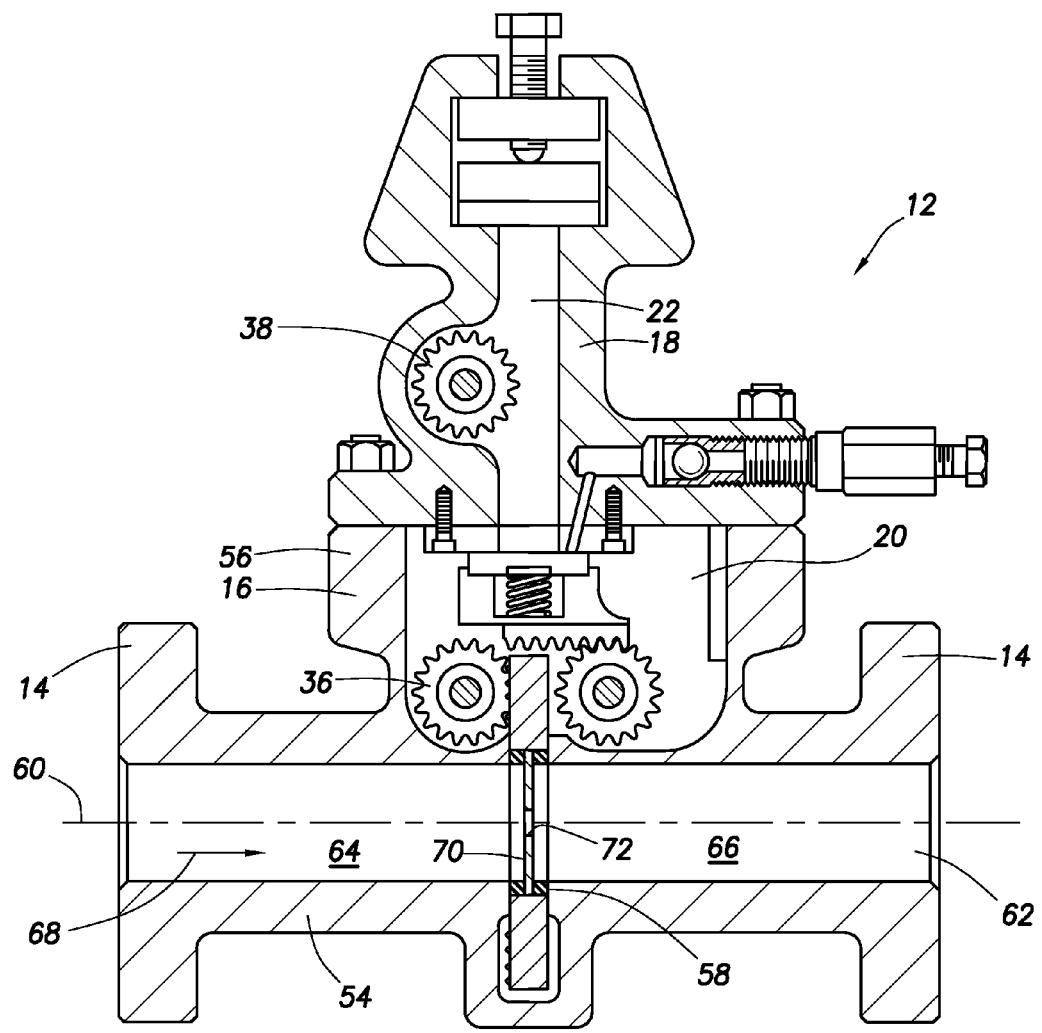
FIG. 1 illustrates a cross-sectional view of an orifice fitting having an orifice plate carrier in accordance with principles described herein.

The following discussion is directed to various embodiments of the invention. One skilled in the art will understand that the following description has broad application, and the discussion of any embodiment is meant only to be exemplary of that embodiment, and not intended to intimate that the scope of the disclosure, including the claims, is limited to that embodiment.

Certain terms are used in the following description and claims to refer to particular system components. As one skilled in the art will appreciate, different persons may refer to a component by different names. This document does not intend to distinguish between components that differ in name but not function. The drawing figures are not necessarily to scale. Certain features of the invention may be shown exaggerated in scale or in somewhat schematic form, and some details of conventional elements may not be shown, all in the interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

FIG. 1 illustrates a cross-sectional view of an orifice fitting with an orifice plate carrier in accordance with the principles disclosed herein. As shown, orifice fitting 12 includes a lower portion 16 coupled to an upper portion 18. Lower portion 16 includes a conduit 54 with a flange 14 disposed at both ends and housing 56 therebetween. Flanges 14 are used to couple orifice fitting 12 between sections of a pipeline. Conduit 54 further includes an axial flowbore 62 therethrough, characterized by a central axis 60 and upstream and downstream regions 64, 66, respectively. A fluid may flow through flowbore 62 from upstream region 64 to downstream region 66 generally in the direction indicated by arrow 68. Housing 56 encloses a lower chamber 20 with a lower drive 36, having a gear shaft and pinions, disposed therein. Upper portion 18 of orifice fitting 12 encloses an upper chamber 22 with an upper drive 38, also having a gear shaft and pinions, disposed therein.

A plate carrier 70 may be raised and lowered within orifice fitting 12 by operating lower drive 36 and upper drive 38. In this illustration, plate carrier 70 is fully inserted into orifice fitting 12. Lower portion 16 further includes a plate carrier guide 58 which serves as a guide to assist in properly locating, aligning, and positioning plate carrier 70 within orifice fitting 12 when plate carrier 70, with orifice plate assembly 72 disposed therein, is inserted or extracted from orifice fitting 12. Specifically, plate carrier guide 58 orients plate carrier 70 such that orifice plate assembly 72 is substantially perpendicular to the direction of fluid flow, indicated by arrow 68.

Figure 2A:
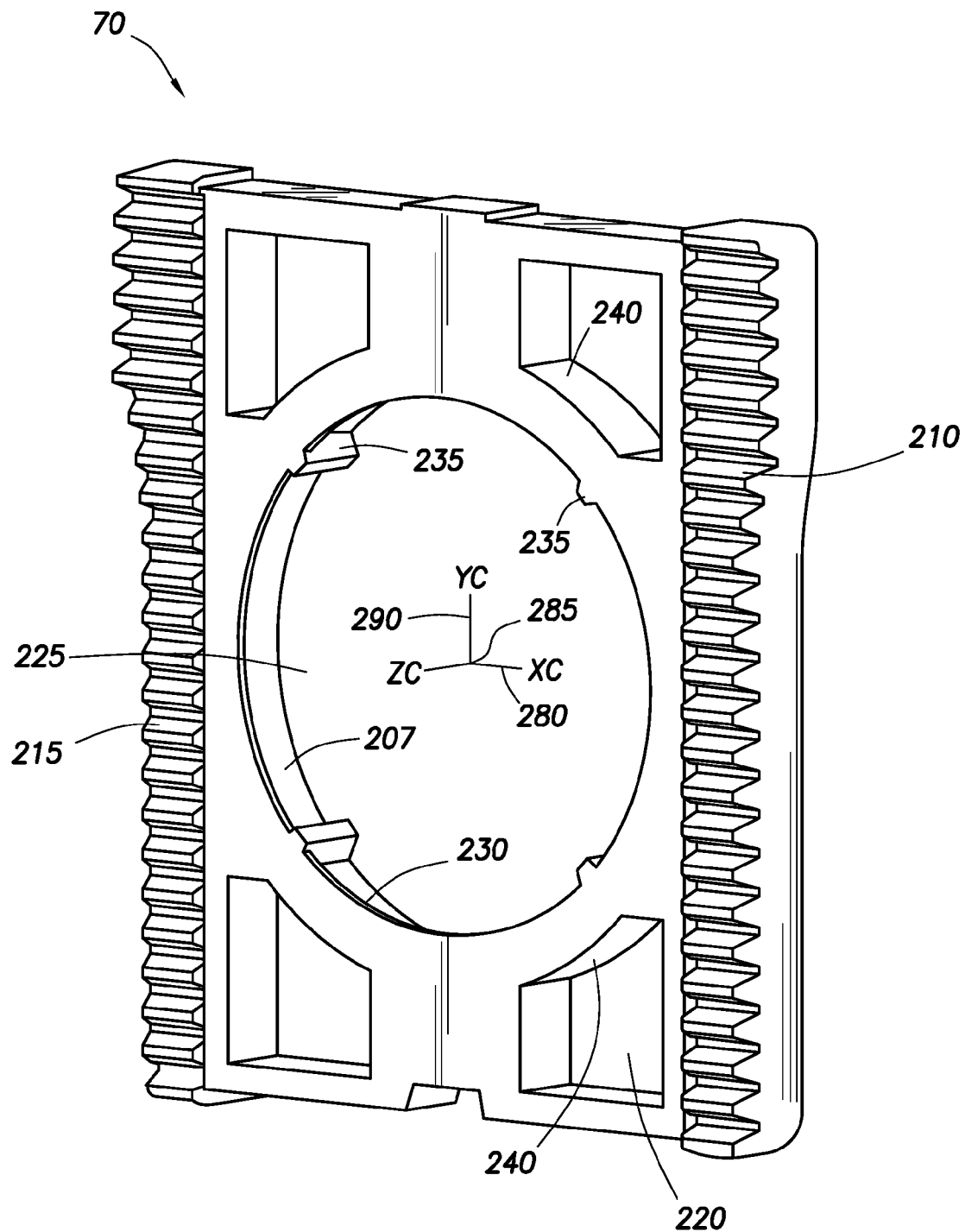
FIG. 2A is a perspective view of the downstream face of the orifice plate carrier of FIG. 1.

FIG. 2A depicts a view of the downstream face of plate carrier 70, which is the side of plate carrier 70 adjacent downstream region 66 when plate carrier 70 is inserted into fitting 12. As shown, plate carrier 70 includes a rectangular body 205 with two parallel racks 210, 215 along opposing sides. In at least some embodiments, body 205 comprises metal, such as stainless steel. Racks 210, 215 are adapted to interface with lower drive 36 and upper drive 38 to enable raising and lowering of plate carrier 70 within plate carrier guide 58 of orifice fitting 12. Plate carrier 70 further includes a plurality of flow ports 220 and an opening 225 through body 205. Opening 225 is configured to receive orifice plate assembly 72.

Flow ports 220 are configured to allow fluid flow therethrough when plate carrier 70 is moved into and out of position within flowbore 62 of fitting 12. In this exemplary embodiment, there are four flow ports 220, each having a rectangular shape with a beveled corner 240 near opening 225. While body 205 includes four flow ports 220 in this exemplary embodiment, there may be fewer or more flow ports 220 in other embodiments. Moreover, flow ports 220 may take other physical shapes and positions within body 205. In all embodiments, however, the size, shape and number of flow ports 220 are such that the total flow area of ports 220 is maximized while maintaining the structural integrity of plate carrier 70 during installation and removal. To that end, beveled corners 240 allow flow ports 220 to be positioned closer to opening 225 and the size of each port 220 to be increased.

Figure 3:
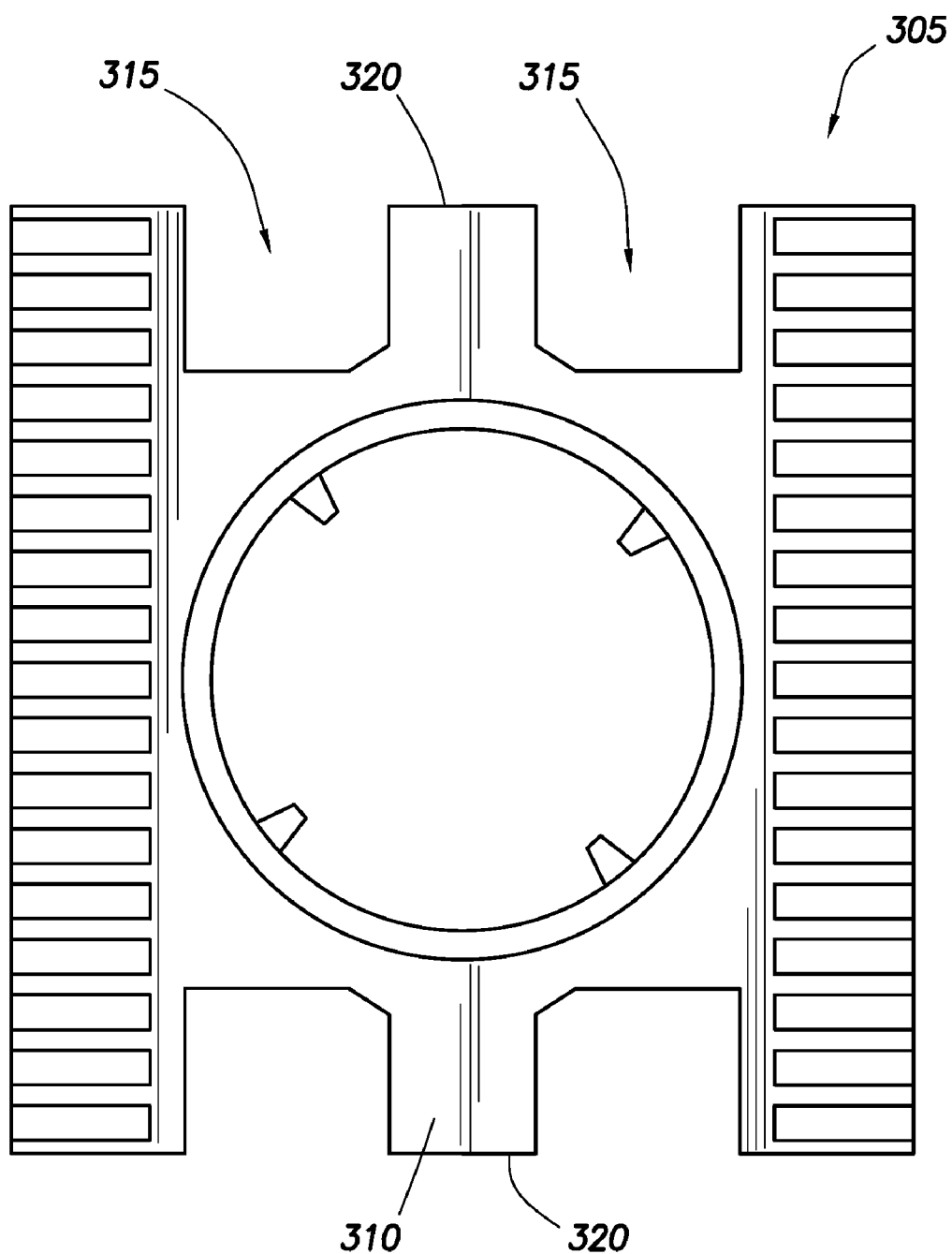
FIG. 3 is a view of the downstream face of an alternative embodiment of an orifice plate carrier.

FIG. 3 depicts another embodiment of an orifice plate carrier in accordance with the principles disclosed herein. In this alternative embodiment, orifice plate carrier 305 also includes a rectangular body 310 having four flow ports 315, each port 315 positioned proximate a different corner of body 310. However, each port 315 extends to the perimeter 320 of body 310, increasing the total flow area of ports 315 beyond that of flow ports 220 illustrated in FIG. 2A during both installation and removal operations.

Figure 2B:
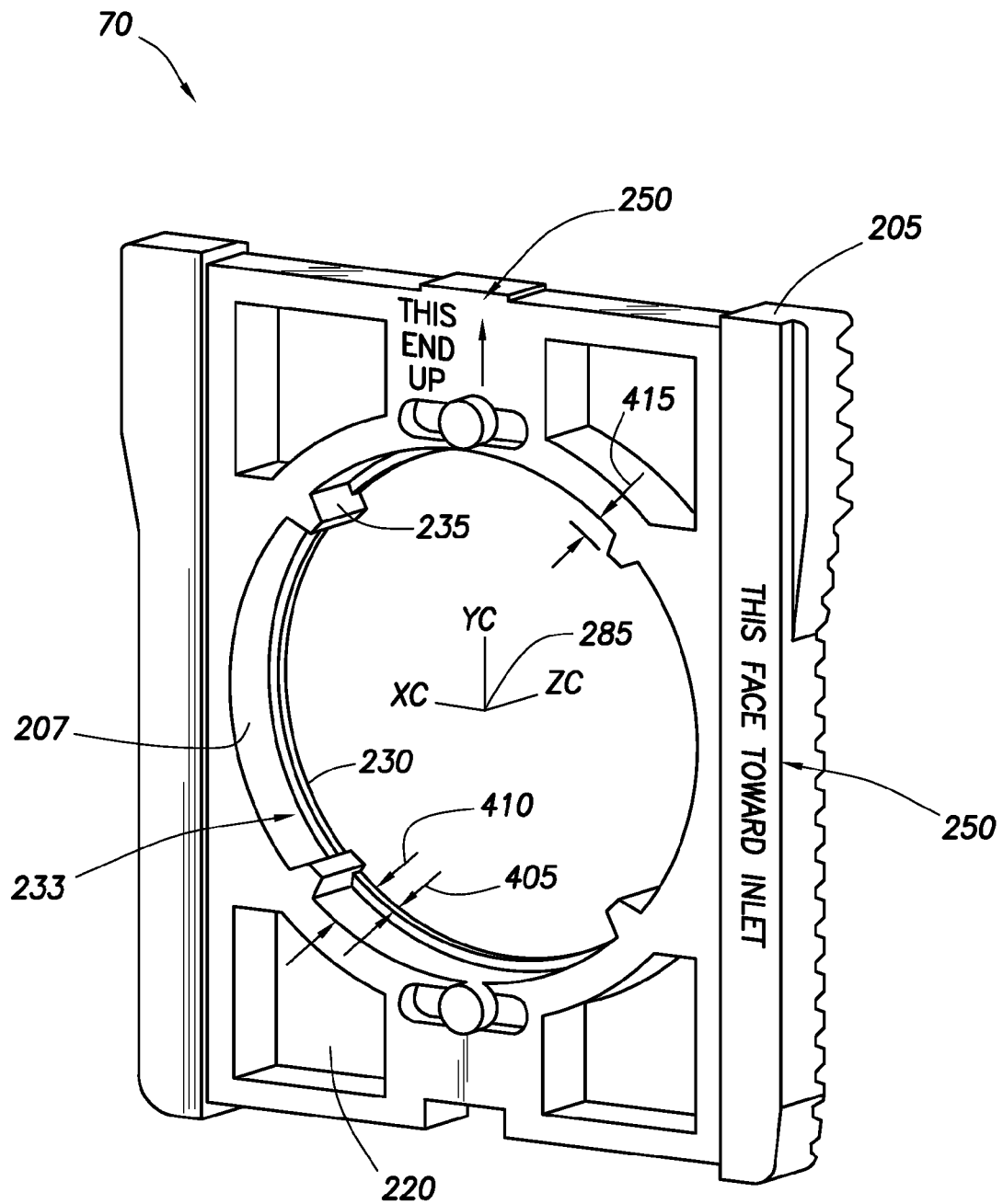
FIG. 2B is a perspective view of the upstream face of the orifice plate carrier of FIG. 1.

Referring again to FIG. 2A, plate carrier 70 further includes a retaining lip 230 and a plurality of notches 235 extending normally from an inner surface 207 of body 205 into opening 225. Retaining lip 230 and notches 235 are also shown in FIG. 2B, which is a view of the upstream face of plate carrier 70. In some embodiments, including those depicted by FIGS. 2A and 2B, retaining lip 230 and/or notches 235 are integral to body 205. Retaining lip 230 extends fully along inner surface 207 and has a thickness 405 less than a width 410 of body 205. As such, retaining lip 230 and inner surface 207 bound a recess 233. Thus, orifice plate assembly 72 may be inserted into opening 225 of plate carrier 70 to seat in recess 233 and abut retaining lip 230.

Notches 235 do not extend along the full circumference of inner surface 207 of body 205, as does retaining lip 230, but instead are positioned at angular positions of 45 degrees, 135 degrees, 225 degrees and 315 degrees, measured from a horizontal line 280 extending from the center 285 of opening 225. Each notch 235 has a height 415 configured to engage an edge of an orifice plate when orifice plate assembly 72, with the orifice plate disposed therein, is inserted into plate carrier 70. In at least some embodiments, notches 235 comprise metal, such as stainless steel, to provide metal-to-metal contact between each notch 235 and the orifice plate.

Plate carrier 70 may further comprises imbedded text 250 to assist the operator during installation of plate carrier 70 into orifice fitting 12 and to prevent the operator from installing plate carrier 70 in the wrong orientation, for example, upside down or with the downstream face of plate carrier 70 facing upstream region 64. The instructional text 250 may comprise words, letters and/or symbols. For example, an arrow may be imbedded in body 205 to indicate the upper edge of orifice plate carrier 70, as shown. As another example, the phrase, "This face toward inlet," may be imbedded in body 205 to indicate the upstream face of orifice plate carrier 70, also as shown.

Figure 4:
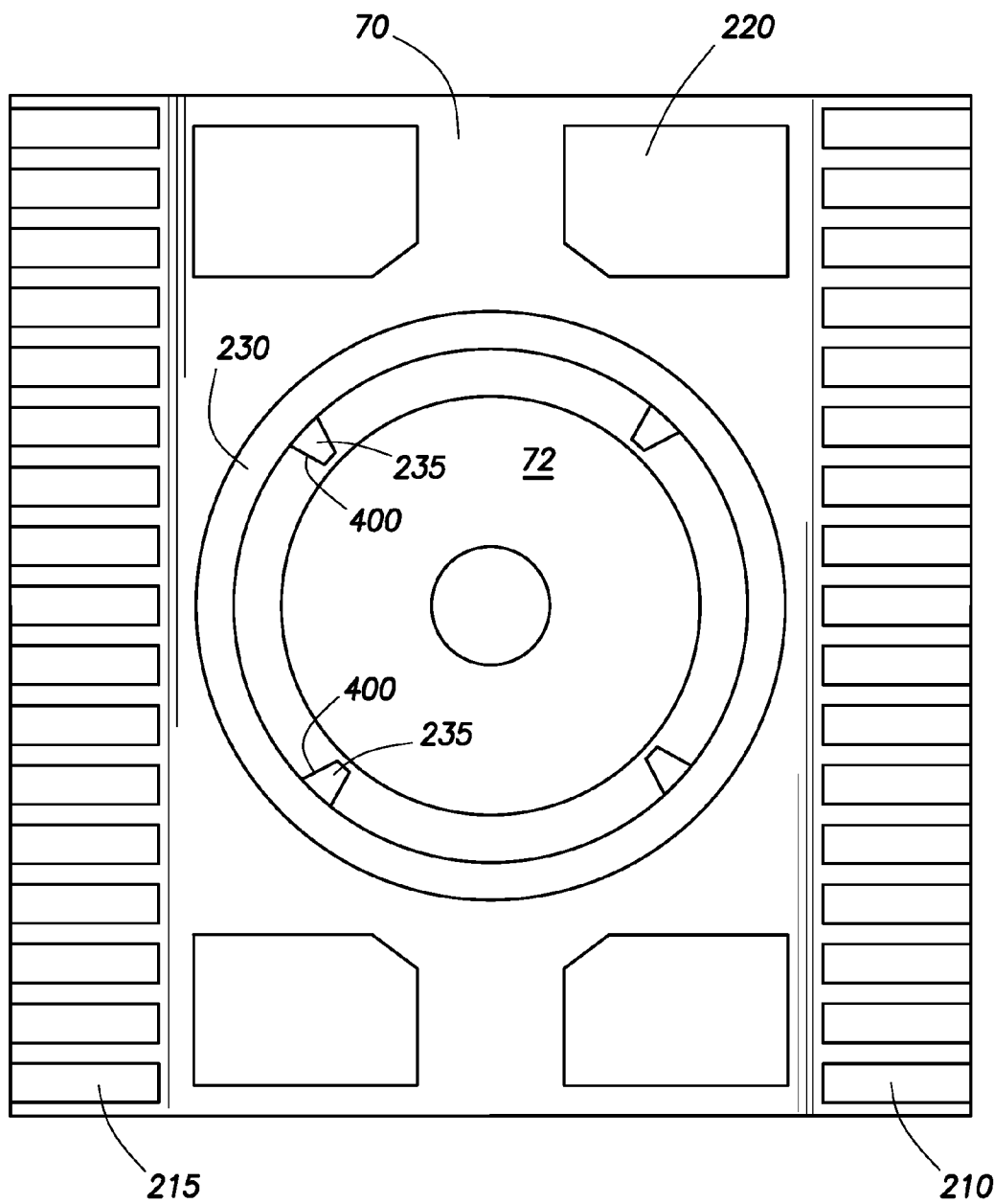
FIG. 4 is view of the downstream face of the orifice plate carrier of FIG. 1 with the orifice plate assembly of FIG. 1 disposed therein.

Prior to operation of orifice fitting 12, orifice plate assembly 72 is inserted into orifice plate carrier 70. FIG. 4 depicts a view of the downstream face of plate carrier 70 with orifice plate assembly 72 disposed therein. Orifice plate assembly 72 includes a plurality of recesses 400 located about its outer circumference. Each recess 400 is shaped to receive a notch 235 of orifice plate carrier 70. To insert orifice plate assembly 72 into orifice plate carrier 70, the operator first orients orifice plate assembly 72 relative to plate carrier 70 such that the downstream side of assembly 72 will abut retaining lip 230 of orifice plate carrier 70 when assembly 72 is inserted into opening 225 (FIGS. 2A, 2B) and seated in recess 233 (FIG. 2B) of plate carrier 70. Next, the operator rotates orifice plate assembly 72 relative to orifice plate carrier 70 so that notches 235 of orifice plate carrier 70 align with recesses 400 of orifice plate assembly 72. Once notches 235 are aligned with recesses 400, the operator then inserts orifice plate assembly 72 into opening 225 (FIGS. 2A, 2B) of plate carrier 72 such that each recess 400 receives a notch 235 and the downstream side of orifice plate assembly 72 fully engages retaining lip 230.

Next, plate carrier 70, with orifice plate assembly 72 disposed therein, is inserted into plate carrier guide 58 of fitting 12, as shown in FIG. 1. Using imbedded text 250, such as that illustrated in FIG. 2B, the operator identifies the upper and lower edges and the upstream and downstream faces of plate carrier 70. The operator then inserts the lower edge of plate carrier 70 into plate carrier guide 58 such that when plate carrier 70 is inserted into flowbore 62 of fitting 12, the downstream face of plate carrier 70 will be adjacent downstream region 66, and the upstream face of plate carrier 70 will be adjacent upstream region 64. Once properly aligned relative to plate carrier guide 58, plate carrier 70 is lowered into position within flowbore 62.

When a conventional plate carrier, with an orifice plate disposed therein, is lowered into the flowbore of an orifice fitting, often the plate carrier temporarily interrupts fluid flow through the fitting. The same is true when the orifice plate carrier is later extracted from the fitting. The interruption of flow causes fluid pressure upstream of the plate carrier to spike, or significantly increase. As a result, a pressure sensor positioned upstream of the orifice plate may be exposed to fluid pressure exceeding its operational limit, thereby causing erroneous pressure measurement at this location. This, in turn, causes inaccurate estimates of fluid flow through the fitting while the plate carrier continues to interrupt flow through the fitting.

An orifice plate carrier in accordance with the principles disclosed herein eliminates this problem. Flow ports 220 of orifice plate carrier 70, for example, allow fluid flow through flowbore 62 to continue uninterrupted when orifice plate carrier 70 is inserted into and extracted from fitting 12. Thus, fluid pressure upstream of plate carrier 70 does not spike, or significantly increase, beyond the operational limit of a pressure sensor(s) positioned upstream of plate carrier 70 as plate carrier 70 is inserted into and extracted from fitting 12. As a result, reliable upstream pressure measurements may be obtained during insertion and extraction of plate carrier 70 from fitting 12.

After plate carrier 70 is positioned in flowbore 62 of fitting 12, fluid pressure continuously acts on orifice plate assembly 72, pushing assembly 72 against retaining lip 230 of orifice plate carrier 70. Because retaining lip 230 extends along the full circumference of inner surface 207 (FIG. 2A) of body 205, the seal between orifice plate assembly 72 and plate carrier 70 is fully supported by retaining lip 230. It should be understood that "full circumference" also includes a retaining lip 230 that extends along substantially all of inner surface 207. Thus, the seal cannot distort or rotate under fluid pressure, and leakage between the seal between orifice plate assembly 72 and plate carrier 70 is prevented.

During operation of fitting 12, the orifice plate disposed within orifice plate carrier 70 must be maintained in a concentric position relative to axis 60 of flowbore 62, within allowable eccentricity limits as may be defined by industry standards. Orifice plate carrier 70 enables concentric positioning of the orifice plate by supporting the weight of the orifice plate with two notches 235 (rather than just one notch positioned at the lowermost point of opening 225), each positioned at the same angular orientation relative to a vertical line 290 (FIG. 2A) bisecting opening 225, and preventing the orifice plate from translating downward due to the effects of gravity. At the same time, all four notches 235 prevent lateral movement of the orifice plate relative to plate carrier 72 under fluid pressure. Thus, the combination of all notches 235 maintains the concentric position of the orifice plate within flowbore 62 during operation of fitting 12.

While preferred embodiments have been shown and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied. Furthermore, thought the openings in the plate carriers are shown as circles, they may include other shapes such as ovals or squares. Accordingly, it is intended that the following claims be interpreted to embrace all such variations and modifications.

What is claimed is:

1. An orifice plate carrier comprising:
   a rectangular body having an opening therethrough and an inner surface surrounding the opening, wherein the inner surface has a length;
   a plurality of flow ports through the body, each flow port proximate a different corner of the body;
   a lip extending radially from the inner surface into the opening and along the full length of the inner surface, the lip having a thickness less than a thickness of the inner surface; and
   an annular recess created by the inner surface and the lip;
   wherein the annular recess is configured to receive an orifice plate assembly inserted through the opening to engage the lip;
   wherein each flow port has a rectangular shape with a beveled corner proximate the opening;
   wherein each flow port is configured to allow fluid therethrough and to reduce a pressure differential between fluid on one side of the body and fluid on another side of the body during installation and extraction of the body.

2. The orifice plate carrier of claim 1, wherein the lip is integral with the body.

3. The orifice plate carrier of claim 1, further comprising:
at least two notches, each notch extending radially from the inner surface into the opening and configured to engage an edge of an orifice plate inserted into the opening;
wherein a first notch and a second notch are located below a horizontal line bisecting the opening.

4. The orifice plate carrier of claim 3, wherein the first notch is located to one side of a vertical line bisecting the opening.

5. The orifice plate carrier of claim 3, wherein the second notch is located to the other side of the vertical line and wherein the first notch and the second notch are equidistant from a centerpoint of the opening.

6. The orifice plate carrier of claim 1, wherein the body further comprises embedded, instructional text.

7. The orifice plate carrier of claim 6, wherein the embedded, instructional text comprises at least one of the group consisting of a word, a symbol, and a letter.

8. An orifice plate carrier comprising:
a body having an opening therethrough;
a plurality of flow ports through the body, each flow port proximate a different corner of the body; wherein each flow port has a rectangular shape with a beveled corner proximate the opening;
an inner surface surrounding the opening and having a lip extending therefrom into the opening; and
at least two notches, each notch extending radially from the inner surface into the opening and configured to engage an edge of an orifice plate inserted into the opening;
wherein a first notch is located below a horizontal line bisecting the opening and to one side of a vertical line bisecting the opening and a second notch is located below the horizontal line and to the other side of the vertical line.

9. The orifice plate carrier of claim 8, wherein a third notch is located above the horizontal line and on the same side of the vertical line as the first notch and a fourth notch is located above the horizontal line and on the same side of the vertical line as the second notch.

10. The orifice plate carrier of claim 9, wherein the first, second, third and fourth notches are equidistant from a centerpoint of the opening.

11. The orifice plate carrier of claim 8, wherein the body and the at least two notches comprise metal.

12. The orifice plate carrier of claim 8, wherein the at least two notches are integral with the body.

13. The orifice plate carrier of claim 8,
wherein each flow port is configured to allow fluid therethrough and to reduce a pressure differential between fluid on one side of the body and fluid on another side of the body during installation and extraction of the body.

14. An orifice plate carrier comprising:
a body having an opening therethrough and an inner surface surrounding the opening, wherein the inner surface has an edge with a length and a lip extending therefrom; and
wherein the body has a rectangular shape with four corners and wherein a plurality of flow ports extend through the body, each flow port proximate a different corner of the body;
wherein each flow port has a rectangular shape with a beveled corner proximate the opening;
wherein each flow port is configured to allow fluid therethrough and to reduce a pressure differential between fluid on one side of the body and fluid on another side of the body during installation and extraction of the body.

15. The orifice plate carrier of claim 14, further comprising:
the lip extending radially from the inner surface into the opening and along the full length of the edge of the inner surface, the lip having a thickness less than a thickness of the inner surface; and
an annular recess created by the inner surface and the lip;
wherein the annular recess is configured to receive an orifice plate assembly inserted through the opening to engage the lip.

16. An orifice fitting including the orifice plate carrier of claim 1 and further comprising:
a conduit having a through passage; and
the orifice plate carrier removably disposed within the conduit, the orifice plate carrier further comprising:
at least two notches, each notch extending radially from the inner surface to engage an orifice plate disposed within the orifice plate assembly;
wherein a first notch is located below a horizontal line bisecting the opening and to one side of a vertical line bisecting the opening and a second notch is located below the horizontal line and to the other side of the vertical line.

17. The orifice fitting of claim 16, wherein the at least two notches maintain the orifice plate in a concentric position relative to a centerline of the through passage.

18. The orifice fitting of claim 16, wherein the lip supports the orifice plate assembly when fluid flows through the conduit and applies a pressure load to the orifice plate assembly.

19. The orifice plate carrier of claim 14, wherein at least one of the flow ports extends to the perimeter of the body.

20. The orifice plate carrier of claim 14, further comprising at least two notches, each notch extending radially from the inner surface to engage an orifice plate disposed within the orifice plate carrier.

21. The orifice plate carrier of claim 20, wherein a first notch is located below a horizontal line bisecting the opening and to one side of a vertical line bisecting the opening and a second notch is located below the horizontal line and to the other side of the vertical line.

* * * * *